United States Patent [19]

Najafi-Sani

[11] Patent Number: 5,464,068
[45] Date of Patent: Nov. 7, 1995

[54] DRILL BITS

[76] Inventor: Mohammad Najafi-Sani, 109 Lily Hill Road, Bracknell, Berkshire, RG12 2RY, United Kingdom

[21] Appl. No.: 157,968

[22] Filed: Nov. 24, 1993

[30] Foreign Application Priority Data

Nov. 24, 1992 [GB] United Kingdom .............. 9224627

[51] Int. Cl.$^6$ ................................................ E21B 10/46
[52] U.S. Cl. ...................... 175/374; 175/434; 408/144
[58] Field of Search ................................ 175/434, 435, 175/374; 408/144, 199

[56] References Cited

U.S. PATENT DOCUMENTS

| | | | |
|---|---|---|---|
| 3,555,937 | 1/1971 | Nicodemas | 175/420.2 X |
| 4,224,380 | 9/1980 | Bovenkerk et al. | |
| 4,228,942 | 10/1980 | Dietrich | |
| 4,627,503 | 12/1986 | Horton | 175/420.2 |
| 4,670,025 | 6/1987 | Pipkin | |
| 4,817,743 | 4/1989 | Greenfield et al. | 175/435 |
| 5,020,394 | 6/1991 | Nakamura et al. | |
| 5,022,801 | 6/1991 | Anthony et al. | |
| 5,096,736 | 3/1992 | Anthony et al. | |
| 5,114,745 | 5/1992 | Jones | |
| 5,282,512 | 2/1994 | Besson et al. | 175/420.2 |
| 5,348,108 | 9/1994 | Scott et al. | 175/432 |

FOREIGN PATENT DOCUMENTS

| | | |
|---|---|---|
| 0009315 | 2/1984 | European Pat. Off. |
| 0454114 | 10/1991 | European Pat. Off. |
| 0467043 | 1/1992 | European Pat. Off. |
| 0474092 | 3/1992 | European Pat. Off. |
| 0480394 | 4/1992 | European Pat. Off. |
| 0488623 | 6/1992 | European Pat. Off. |
| 324829 | 4/1903 | France |

OTHER PUBLICATIONS

Patent Abstracts of Japan, vol. 13, No. 512 (M–893) & JP–A–01 206 004, Aug. 18, 1989.
Patent Abstracts of Japan, vol. 9, No. 286 (M–429) & JP–A–60 127 912, Jul. 8, 1985.
Patent Abstracts of Japan, vol. 16, No. 563 (M–1342) & JP–A–04 217 414, Aug. 7, 1992.
Patent Abstracts of Japan, vol. 9, No. 279 (M–427) & JP–A–60 123 209, Jul. 1, 1985.
Patent Abstracts of Japan, vol. 4, No. 183 (M–47) & JP–A–55 131 403, Oct. 13, 1980.
Patent Abstracts of Japan, vol. 9, No. 317 (C–319) & JP–A–60 152 649, Aug. 10, 1985.

*Primary Examiner*—William P. Neuder
*Attorney, Agent, or Firm*—Scully, Scott, Murphy & Presser

[57] ABSTRACT

A drill bit comprises a working end having a slot formed therein and an unbacked diamond insert located in the slot and bonded to the working end, typically by brazing. The diamond insert will present a cutting edge or point for the bit. The diamond insert may be made of CVD diamond or diamond compact.

9 Claims, 1 Drawing Sheet

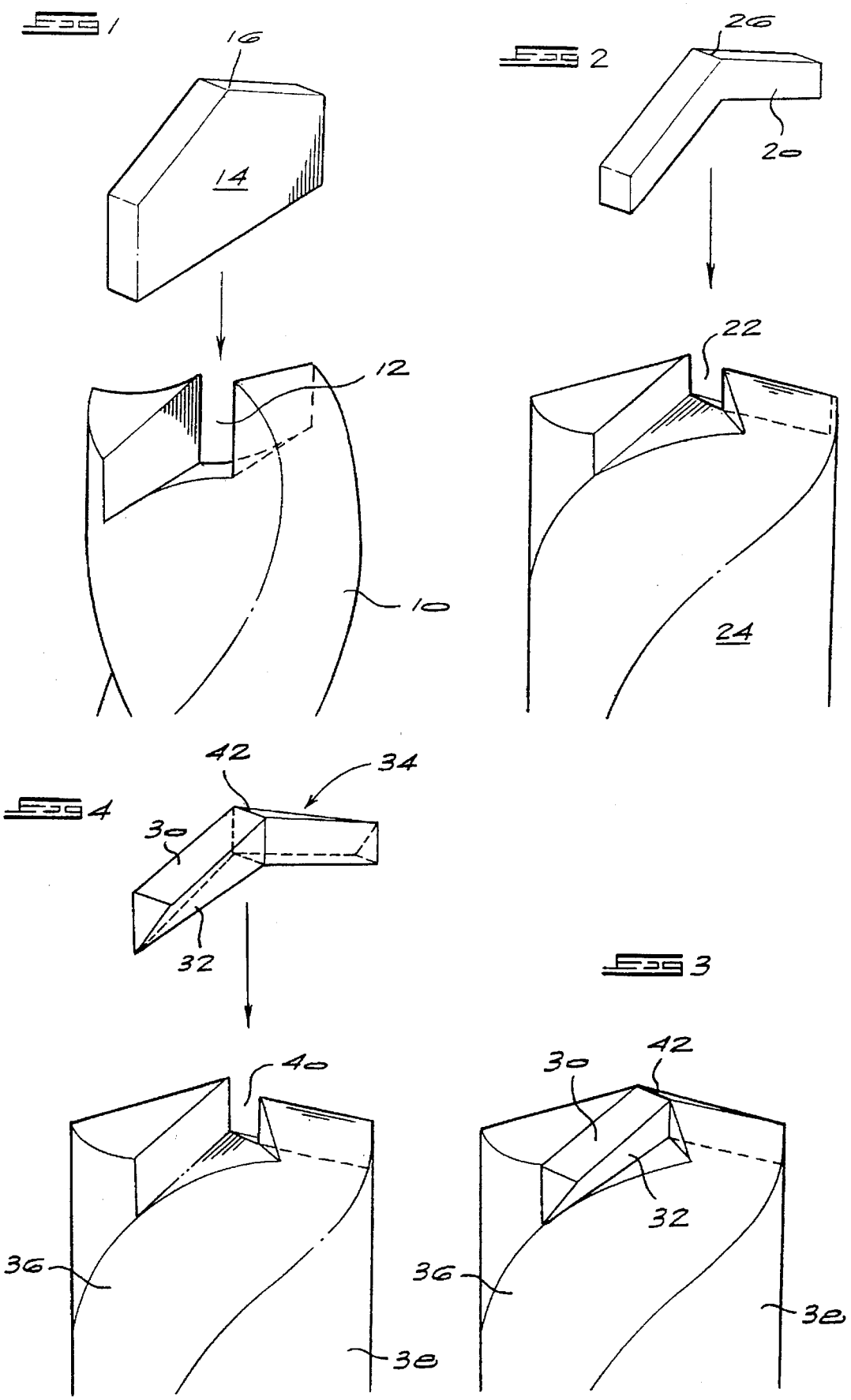

DRILL BITS

BACKGROUND OF THE INVENTION

This invention relates to drill bits.

Drill bits are known which utilise diamond or a diamond material as the cutting point. One example of such a drill bit utilises a cemented carbide insert located in a slot in the working end of a drill bit, the insert having a cutting edge of polycrystalline diamond.

CVD diamond is diamond produced by chemical vapour deposition. Chemical vapour deposition of diamond is well established and described extensively in the patent and other literature. Broadly speaking, the method involves providing a mixture of hydrogen or oxygen gas and a suitable gaseous carbon compound such as a hydrocarbon, applying sufficient energy to that gas to dissociate the hydrogen or oxygen into atomic hydrogen or oxygen, and the gas into active carbon ions, atoms or CH radicals, and allowing such species to deposit on a substrate to form diamond. Dissociation of the gases can take place by use of a hot filament or microwave or RF energy.

SUMMARY OF THE INVENTION

According to the present invention, a drill bit comprises a working end having a slot formed therein and an unbacked diamond insert located in the slot and bonded to the working end, the diamond insert presenting a cutting edge or point for the bit.

BRIEF DESCRIPTION OF THE DRAWINGS

FIG. 1 is an exploded view of a working end of a first embodiment of the invention, FIG. 2 is an exploded view of a working end of a second embodiment of the invention, FIG. 3 is a view of a working end of a third embodiment of the invention, and FIG. 4 is an exploded view of FIG. 3.

DESCRIPTION OF EMBODIMENTS

The drill bit may be a macro drill bit or a micro drill bit. Micro drill bits will have a diameter of less than 5 mm. Examples of drills are twist drills and gun drills.

The diamond insert will generally consist of a layer of diamond. The diamond may be single crystal diamond or polycrystalline diamond. Preferred examples of polycrystalline diamond are diamond compacts and CVD diamond.

A CVD diamond layer may be produced by any CVD method known in the art and may be polycrystalline or single crystal.

When the diamond insert is a diamond compact, it will be polycrystalline. Diamond compacts are known in the art and consist of polycrystalline masses of diamond produced under diamond synthesis conditions. The diamond compact may contain a matrix containing a diamond catalyst/solvent in which event the compact will generally be thermally sensitive at temperatures above about 700° C. The diamond compact may also be one which is thermally stable at temperatures above 700° C.

The thickness of the diamond layer will typically be in the range 150 to 500 microns, preferably about 300 microns, for drill bit diameters less than 5 mm and up to 1,5 mm for larger drill bit diameters up to 12 mm.

The insert may have any suitable shape. For example, it may have a straight base, straight sides extending from the base and a top which joins the sides and is roof-top in shape. It may also have a chevron shape, the side surfaces of which may be further shaped and match the flutes on a drill bit.

It is important that the diamond insert be firmly bonded to the working end of the drill bit. The diamond insert will be bonded directly to the drill bit which will generally be made of a metal. Examples of suitable metals are hardened steels and carbide.

Bonding of the diamond insert to the working end of the drill bit will preferably be achieved by means of brazing. The nature of the braze and brazing temperature used will depend on the nature of the diamond insert. When the diamond insert is CVD diamond or thermally stable diamond compact, high temperature brazes and brazing temperatures of up to 1100° C. may be used. For thermally sensitive diamond compacts, brazing temperatures of up to 950° C. may be used. The time at which such compacts are exposed to the brazing temperature should be kept to a minimum to avoid graphitisation, and preferably less than five seconds.

Brazing of the insert to the working end of the drill bit can best be achieved by brazing the insert to the working end using an active braze alloy. Examples of suitable braze alloys are those which are silver/copper based and contain a minor amount of an active metal such as titanium or zirconium. The active metal removes any remnant surface oxides and therefore no flux is needed. An argon gas, however, may be used to protect the braze area from further oxidation at the high brazing temperatures. An example of a preferred braze alloy is one which has 20 to 40 percent copper, 60 to 80 percent silver and a minor amount, typically less than 10 percent, of an active metal such as titanium or zirconium, all percentages being by mass. Examples of two particularly suitable braze alloys are (percentages by mass):

| Silver (%) | Copper (%) | Titanium (%) |
| --- | --- | --- |
| 68,8 | 26,7 | 4,5 |
| 75 | 20 | 5 |

The brazing temperature for this range of braze alloys is between 850° and 950° C.

The drill bits of the invention may be used to drill a variety of materials such as wood, non-ferrous materials, printed circuit boards and the like.

Embodiments of the invention will now be described with reference to the accompanying drawings. Referring first to FIG. 1, the fluted working end 10 of a drill bit has a slot or groove 12 formed therein. A diamond layer 14 having a cutting point 16, is inserted in the slot and brazed directly to the working end using a braze alloy of the type described above.

FIG. 2 illustrates a second embodiment of the invention. In this embodiment, a diamond insert 20 has a chevron shape and is brazed directly into a slot 22 formed in the working end 24 of a drill bit. The diamond insert presents cutting point 26.

FIGS. 3 and 4 illustrate a third embodiment of the invention. In this embodiment, a diamond insert 30 is chevron shaped, but opposed side surfaces 32, 34 thereof are angled or cut back so that these surfaces match the flutes 36 of the working end 38 of a drill bit when the insert 30 is brazed directly into slot 40 of the drill bit (see FIG. 4). The diamond insert presents cutting point 42. It is to be noted that no shaping of the hard diamond insert 30 is required. In prior art drill bits utilising diamond or diamond material cutting edges, considerable amount of grinding is needed in the flute area. The diamond insert 30 presents cutting point 42.

A drill bit of the type illustrated by FIG. 1 and utilising a CVD diamond layer 14 as the diamond insert was produced. The diamond insert was brazed to the working end of the drill bit using a silver/copper/titanium (68,8/26,7/4,5) braze alloy, as described above. A brazing temperature of 850° to 950° C. was used and this temperature was maintained for a period of 5 seconds. The diamond insert was firmly bonded directly to the drill bit which is made of carbide.

A series of tests were carried out to assess the strength of the braze bond, the toughness of the insert and other wear characteristics of the drill bit. The drill bit was used to drill holes in two materials. One material was Sifter (silicon flour filled epoxy resin, a test material which is highly abrasive ) and the other material was a silicon/aluminium alloy containing 20 percent by volume silicon. The conditions used for the drilling and the results obtained are set out below:

| Speed (rpm) | Feed (mm/min) | Depth (mm) | No. of holes | Condition |
| --- | --- | --- | --- | --- |
| | | Siffer Test | | |
| Drill 1 4200 | 600 | 10 | 500 | Dry |
| Drill 2 4200 | 600 | 10 (20% SiAl) | 500 | Dry |
| Drill 1 4200 | 200 | 10 | 500 | Wet |
| Drill 2 4200 | 200 | 10 | 50 | Wet |

The drilling was stopped after 500 holes had been drilled in each case and the drill bits examined. There was no visual sign of damage to the bits or to the diamond inserts.

By way of comparison, standard carbide drill bits were put through identical tests. It was found that the drill bits were able to produce only 5 holes in Siffer before severe wear of the drill bit took place. In the case of the silicon/aluminium alloy, the carbide drill bits were able to produce 70 holes before considerable damage to the drill bit was observed.

I claim:

1. A drill bit comprising a working end having a slot formed therein and an unbacked diamond insert consisting of a layer of CVD diamond located in the slot and bonded directly to the working end by a braze alloy, the diamond insert presenting a cutting edge or point for the bit.

2. A drill bit according to claim 1 wherein the drill bit has a diameter of less than 5 mm, and the thickness of the diamond layer is in the range 150 to 500 microns.

3. A drill bit according to claim 1 wherein the diameter of the drill bit is up to 12 mm, and the thickness of the diamond layer is up to 1,5 mm.

4. A drill bit according to claim 1 wherein the diamond insert has a chevron shape.

5. A drill bit according to claim 1 wherein the insert has a straight base, straight sides extending from the base, and a top joining the sides and of roof-top shape.

6. A drill bit according to claim 1 wherein the braze alloy is silver/copper based and contains a minor amount of an active metal.

7. A drill bit according to claim 6 wherein the braze alloy is one which has 20 to 40 percent copper, 60 to 80 percent silver, and a minor amount of an active metal, all percentages being by mass.

8. A drill bit according to claim 7 wherein the active metal is present in an amount of less than 10 percent by mass.

9. A drill bit according to claim 6 wherein the active metal is titanium and zirconium.

\* \* \* \* \*